United States Patent
Sakashita (10) Patent No.: US 9,785,832 B2
(45) Date of Patent: Oct. 10, 2017

(54) IMAGE PROCESSING APPARATUS FOR SCANNING IMAGE DATA OF A BOOK AND MATCHING THE SCANNED IMAGE TO REGISTERED IMAGE DATA ON A SERVER, IMAGE PROCESSING SYSTEM, AND IMAGE PROCESSING METHOD

(71) Applicant: KYOCERA Document Solutions Inc., Osaka (JP)

(72) Inventor: Fumiya Sakashita, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 15/006,668

(22) Filed: Jan. 26, 2016

(65) Prior Publication Data

US 2016/0227053 A1    Aug. 4, 2016

(30) Foreign Application Priority Data

Jan. 30, 2015   (JP) .................................. 2015-016514

(51) Int. Cl.
*G06K 9/00* (2006.01)

(52) U.S. Cl.
CPC ..... *G06K 9/00469* (2013.01); *G06K 2209/01* (2013.01)

(58) Field of Classification Search
CPC ................................................ G06K 9/00469
See application file for complete search history.

(56) References Cited

U.S. PATENT DOCUMENTS

| 2006/0095436 A1* | 5/2006 | Abe ................... G06F 17/30861 |
| 2007/0223955 A1* | 9/2007 | Kawabuchi ............ G03G 21/04 |
| | | 399/80 |
| 2015/0324570 A1* | 11/2015 | Lee ...................... G06K 9/3208 |
| | | 382/124 |
| 2016/0019008 A1* | 1/2016 | Matsumoto ........... G06F 3/1247 |
| | | 358/1.13 |

FOREIGN PATENT DOCUMENTS

| JP | H11-096148 A | 4/1999 |
| JP | 2001016379 A | 1/2001 |
| JP | 2007183974 A | 7/2007 |
| JP | 2009-230559 A | 10/2009 |

* cited by examiner

*Primary Examiner* — Benjamin O Dulaney
(74) *Attorney, Agent, or Firm* — IP Business Solutions, LLC

(57) ABSTRACT

A document image reading section is configured to read, among documents constituting a book, an image of a document of one page of the book. A document image checking section is configured to check the read image of the read document against registered images of documents stored in a server to determine whether or not the registered image matching the read image exists. When the registered image matching the read image exists, a document image acquisition section acquires the matching registered image. A document image printing section forms an image on a paper sheet using the acquired registered image.

5 Claims, 10 Drawing Sheets

701 — NO DOCUMENT TO BE PRINTED EXISTS.

702 — PLEASE SCAN DOCUMENTS TO BE PRINTED PAGE BY PAGE.

| PRIORITIES | CHECK TARGET |
|---|---|
| 1 | PAGE NUMBER, CHAPTER TITLE/ CHAPTER NUMBER |
| 2 | CHAPTER TITLE/CHAPTER NUMBER, FIGURE/TABLE |
| 3 | NUMBER OF CHARACTERS |
| 4 | PAGE NUMBER, FIGURE/TABLE |
| 5 | PAGE NUMBER, NUMBER OF CHARACTERS |
| 6 | TOTAL NUMBER OF CHARACTERS |

IMAGE PROCESSING APPARATUS FOR SCANNING IMAGE DATA OF A BOOK AND MATCHING THE SCANNED IMAGE TO REGISTERED IMAGE DATA ON A SERVER, IMAGE PROCESSING SYSTEM, AND IMAGE PROCESSING METHOD

INCORPORATION BY REFERENCE

This application claims priority to Japanese Patent Application No. 2015-016514 filed on Jan. 30, 2015, the entire contents of which are incorporated by reference herein.

BACKGROUND

The present disclosure relates to image processing apparatuses, image processing systems, and image processing methods.

There are various kinds of techniques for searching for a read and stored image on an image processing apparatus, such as a scanner, a copier or a multifunction peripheral. For example, a printer is disclosed which is capable of searching for pieces of document information (images) containing particular date information among those registered in a particular memory, assigning identification information to the pieces of document information containing the particular date information, and displaying a list of all the pieces of document information so that the pieces of document information having identification information assigned thereto are higher on the list. Thus, pieces of document information likely to be used at regular intervals can be easily retrieved.

SUMMARY

A technique improved over the above technique is proposed as one aspect of the present disclosure.

An image processing apparatus according to an aspect of the present disclosure is connected to a server and includes a document image reading section, a document image checking section, a document image acquisition section, and a document image printing section.

The document image reading section is configured to read, among documents constituting a book, an image of a document of at least one page of the book.

The document image checking section is configured to check the read image of the document read by the document image reading section against registered images of documents stored in the server to determine whether or not the registered image matching the read image exists.

The document image acquisition section is configured to, when the document image checking section determines that the registered image matching the read image exists, acquire the matching registered image.

The document image printing section is configured to form an image on a paper sheet using the registered image acquired by the document image acquisition section.

An image processing system according to another aspect of the present disclosure includes the above-described image processing apparatus and the above-described server.

The server includes a storage section configured to store the registered images of the documents.

An image processing method according to still another aspect of the present disclosure includes reading, checking, acquiring, and forming.

In the reading, among documents constituting a book, an image of a document of at least one page of the book.

In the checking, the read image of the document read is checked against registered images of documents stored in a server to determine whether or not the registered image matching the read image exists.

In the acquiring the matching registered image when it is determined that the registered image matching the read image exists.

In the forming, an image is formed on a paper sheet using the registered image acquired.

BRIEF DESCRIPTION OF THE DRAWINGS

FIG. 4 shows a view of an example of an operating screen in the embodiment of the present disclosure (FIG. 4A) and a view of an example of a book printing screen in the embodiment of the present disclosure (FIG. 4B).

DETAILED DESCRIPTION

Hereinafter, with reference to the drawings, a description will be given of an image processing apparatus, an image processing system, and an image processing method each according to an embodiment as one aspect of the present disclosure. The following embodiment is simply a specific example of the present disclosure and not intended to limit the technical scope of the present disclosure. The alphabetical character S affixed before each numeral in the flowchart means "step".

A description will be given below of, as an example of the embodiment of the present disclosure, an image processing system including a terminal device and an image processing apparatus. For example, a multifunction peripheral (MFP) having a facsimile function, a copy function, a scan function, a print function, and so on corresponds to the image processing apparatus of the present disclosure.

Figure 1:
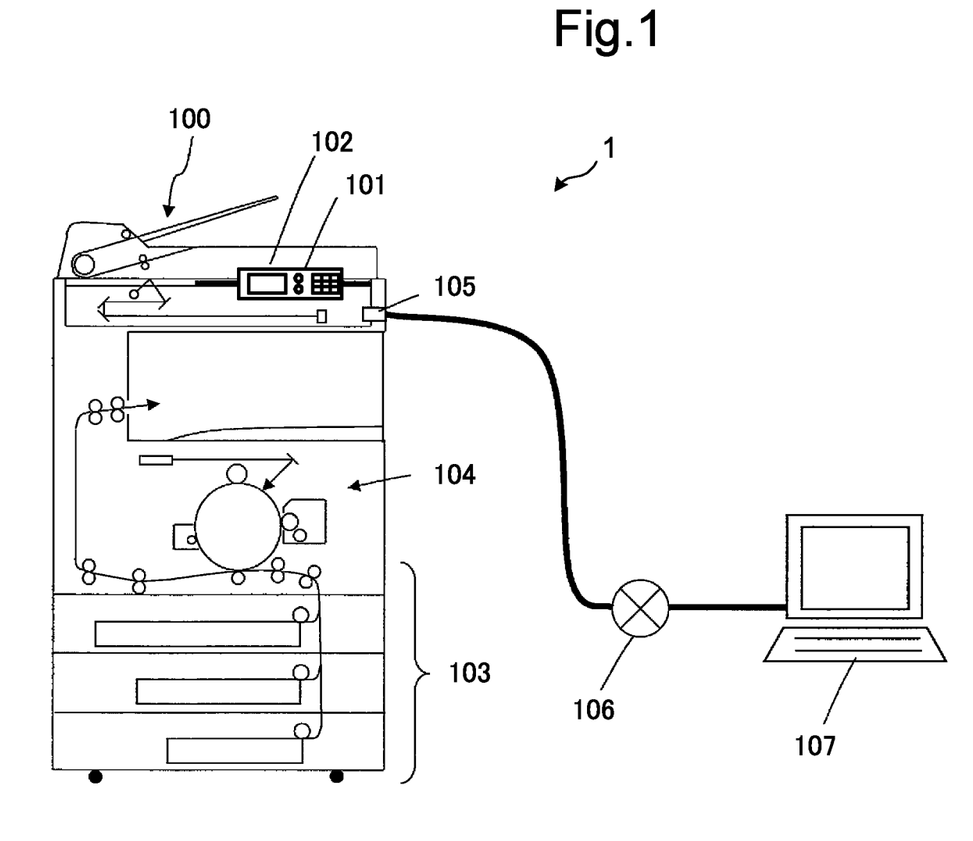
FIG. 1 shows a conceptual view showing a general configuration of an image processing system according to an embodiment of the present disclosure.

When accepting from a user a setting condition about a print job for printing an original document through an operating section 101 including a touch panel as shown in FIG. 1, a multifunction peripheral 100 activates constituent sections, such as an image reading section 102, a sheet conveyance section 103, and an image forming section 104. The operating section 101 includes a display having a touch panel function, through which user's instructions for setting conditions can be entered and which can display the setting conditions on the screen. The image reading section 102 is configured to read an image of an original document placed on an original glass plate or images of original documents placed on an automatic document feed section. The sheet conveyance section 103 is configured to, based on the setting conditions, convey a sheet from a sheet feed cassette or a manual feed tray on which a sheet has been previously placed. The image forming section 104 is configured to transfer a toner image corresponding to an image of the original document to the sheet conveyed thereto and fix the toner image on the sheet with a fixing roller, thus forming an image on the sheet. The sheet on which an image has been formed is discharged through the sheet conveyance section 103 to an output tray.

The multifunction peripheral 100 includes a communication section 105 connected for communication to a network 106. The communication section 105 is capable of communicating with a server 107 (for example, a server in a cloud) connected via the network 106 to send or receive images of original documents to or from the server 107. The server 107 is an example of the terminal device. Therefore, the multifunction peripheral 100 and the server 107 constitute an image processing system 1.

A control circuit 10 (see FIG. 2) of the multifunction peripheral 100 includes a CPU (central processing unit), a ROM (read only memory), a RAM (random access memory), an SSD (solid state drive), and an HDD (hard disk drive). In the control circuit 10, drivers associated with their respective drive parts are electrically connected to each other via an internal bus. The server 107 also includes a control circuit having a similar configuration. The CPU in each of the multifunction peripheral 100 and the server 107 uses, for example, the RAM as a working region to execute programs stored in the ROM, the SSD, the HDD, and so on, communicates, based on the program execution results, data from the drivers, commands, signals, instructions, and so on, and controls the individual operations of the drive parts in relation to the execution of various processing.

Also for the after-mentioned sections (shown in FIG. 2) of the multifunction peripheral 100 other than the drive parts, the CPU achieves the implementation of the sections by executing their relevant programs. The ROM, RAM, SSD, HDD, and so on of the control circuit 10 of the multifunction peripheral 100 store the programs and data for achieving the implementation of the sections to be described later.

Figure 2:
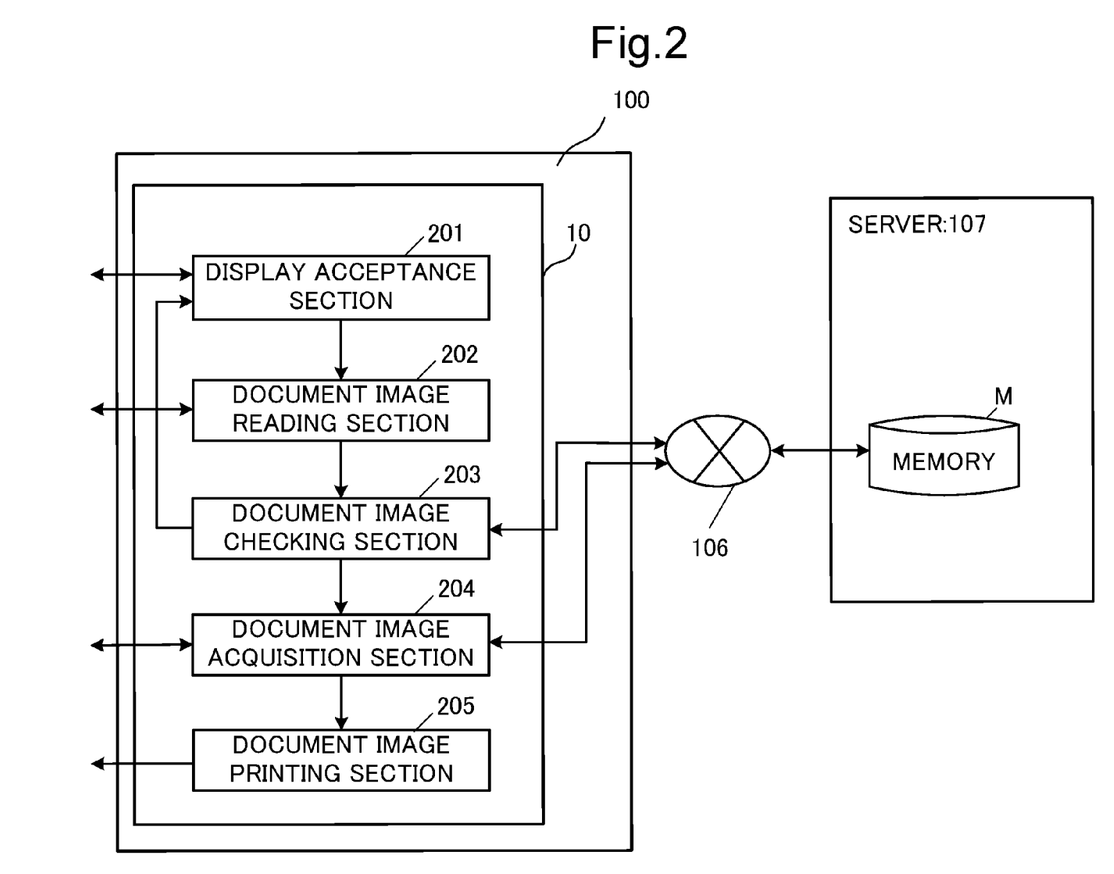
FIG. 2 is a functional block diagram of the image processing system according to the embodiment of the present disclosure.

Next, a description will be given of a configuration and an execution procedure relevant to the embodiment of the present disclosure with reference to FIGS. 2 and 3. First, when a user enters a library or like facility and starts up a multifunction peripheral 100 placed in the library, a display acceptance section 201 of the multifunction peripheral 100 allows the display of the operating section 101 to display a predetermined particular operating screen 400 (S101 in FIG. 3).

Figure 4A:
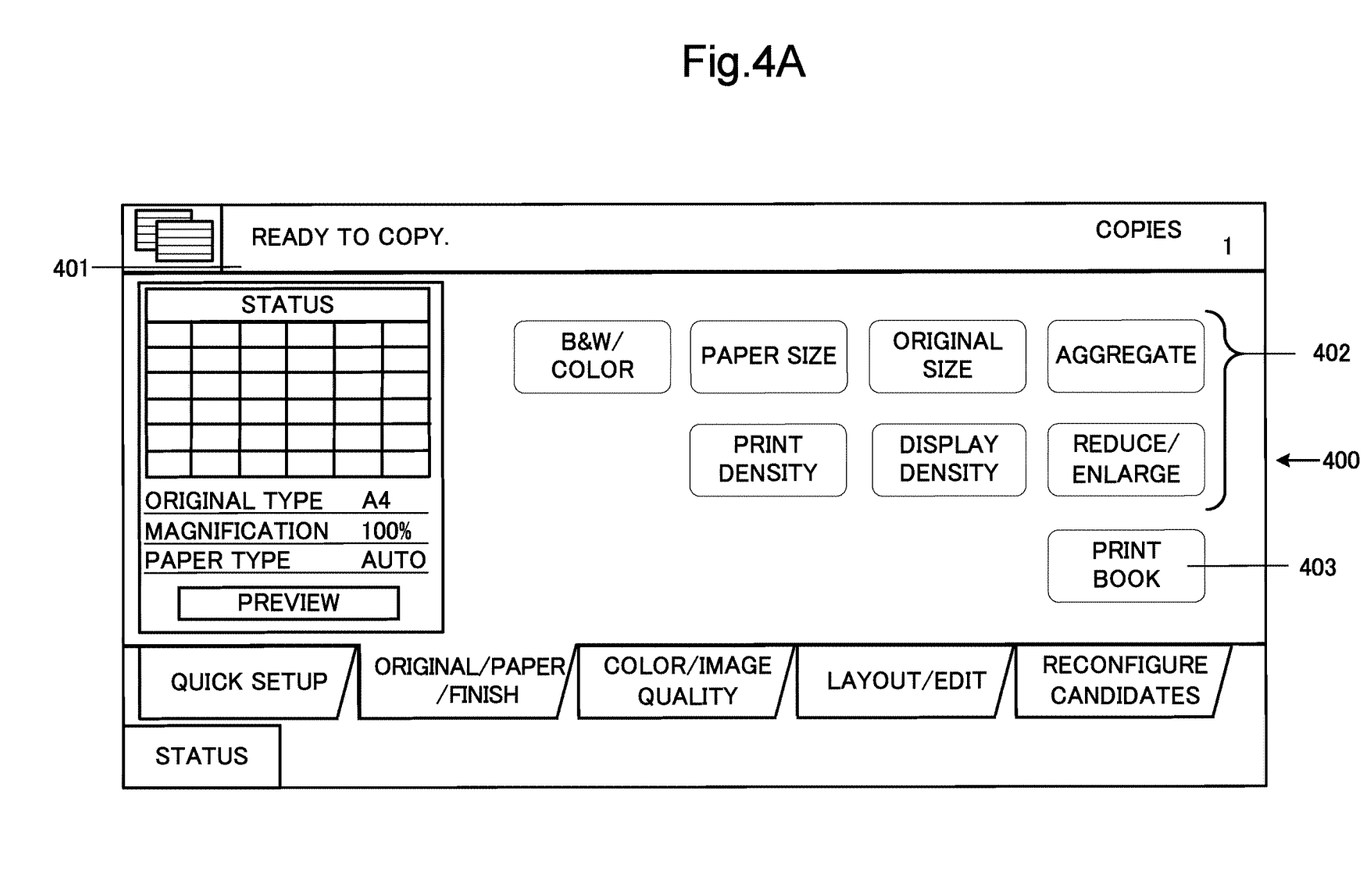

As shown in FIG. 4A, displayed on the operating screen 400 are a message 401 indicating a print job, setting item keys 402 through which setting conditions for the print job are entered, and a print book key 403 through which an entry of an instruction to execute book printing for printing contents of a book is accepted.

The user brings a particular book from a book shelf of the library to the multifunction peripheral 100. When the user operates the print book key 403, the display acceptance section 201 accepts an instruction to execute book printing using the touch panel function and allows the display to display a book printing screen 404 for book printing (S102 in FIG. 3).

Figure 4B:
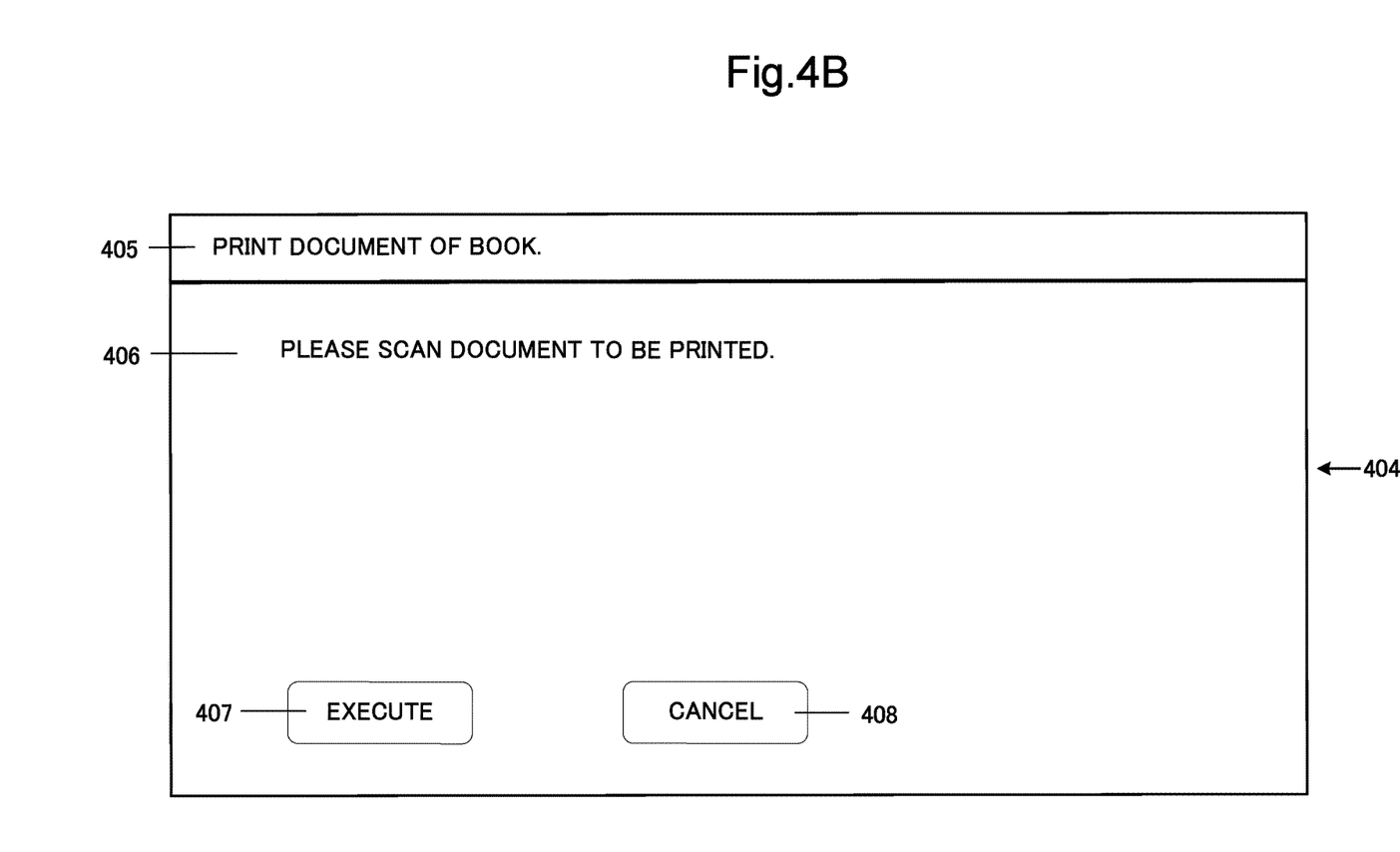

As shown in FIG. 4B, displayed on the book printing screen 404 are a message 405 indicating book printing, a message 406 prompting the user for reading (scanning) of a document to be printed, a scan document key 407 through which an entry of an instruction to start reading an image of the document is accepted, and a cancel key 408.

When at this time the user places a document of the book on the original glass plate of the image reading section 102 and operates the scan document key 407, the display acceptance section 201 accepts the selection of the scan document key 407 using the touch panel function and notifies a document image reading section 202 of the acceptance of the selection. The document image reading section 202 having received the notification allows the image reading section 102 to read, among documents constituting the book, an image of a document of one page of the book (S103 in FIG. 3).

For example, the document image reading section 202 controls the image reading section 102 to read the image of the document. Thereafter, when completing the reading of the image of the document, the document image reading section 202 notifies a document image checking section 203 of the completion of the reading. The document image checking section 203 having received the notification accesses the server 107 connected for communication thereto via the network 106 (S104 in FIG. 3).

Figure 5A:
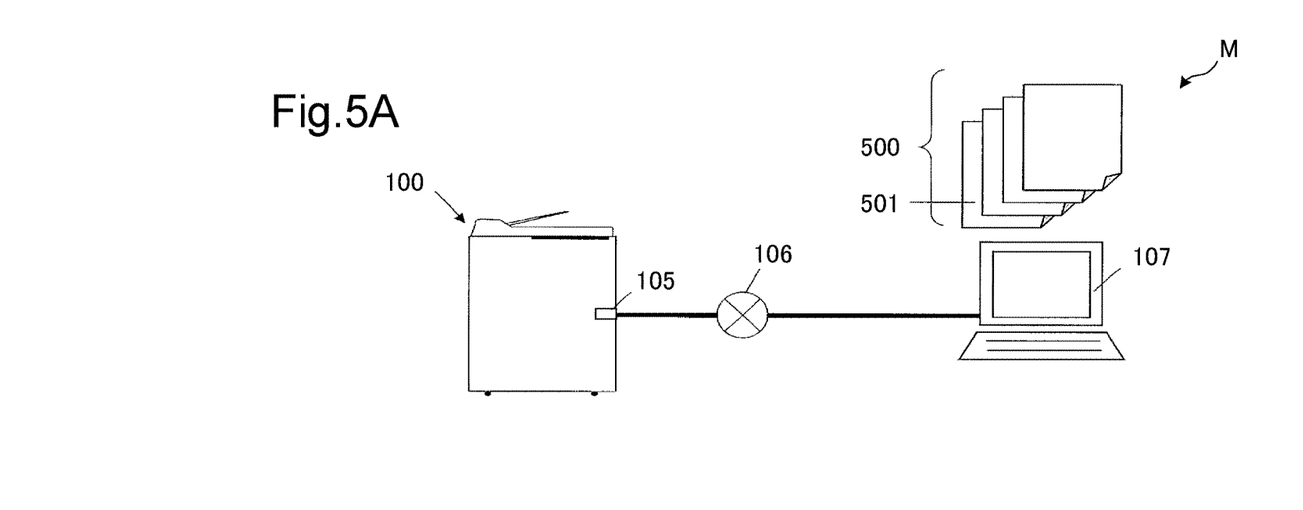
FIG. 5A is a view showing an example of a database for registered images in the image processing system according to the embodiment of the present disclosure.

In the server 107, as shown in FIG. 5A, images 500 of documents constituting every page of the particular book scanned in a brand-new condition are previously stored in a particular memory M. In other words, the particular book of which the images 500 of every page are stored in the server 107 is the same book as that which the user has brought from a book shelf of the library in order to allow the multifunction peripheral 100 to read it. Therefore, the particular memory M serves as a database for the images of documents of the particular book. The document image checking section 203 of the multifunction peripheral 100 first acquires, from among the images 500 of documents stored in the particular memory M of the server 107, an image 501 of a document of one page as a registered image and checks the read image 502 of the document of the one page (read in S103) against the acquired registered image 501 of the document to determine whether or not the registered image 501 matches the read image 502 (S105 in FIG. 3).

Figure 5B:
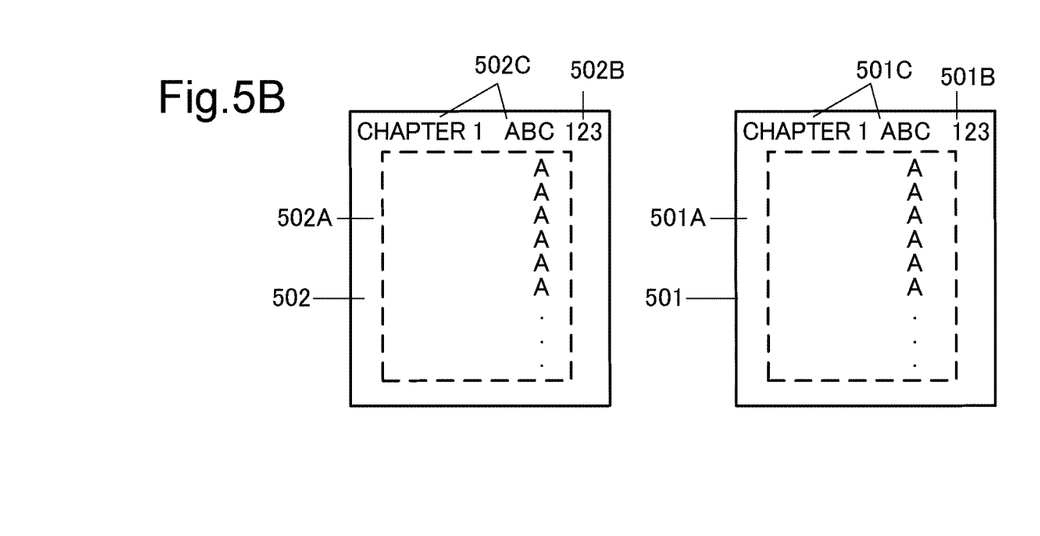
FIG. 5B is a view showing respective examples of a read image and a registered image in the embodiment of the present disclosure.

In the above checking, for example, as shown in FIG. 5B, the document image checking section 203 searches for a numeric image existing in a marginal image region 502A of the read image 502 extending a predetermined distance from the marginal edges toward the center of the read image 502. When determining, for example, using an OCR function, that a numeric image 502B (for example, "123") exists in the marginal image region 502A, the document image checking section 203 acquires the numeric image 502B as a page number. Likewise, the document image checking section 203 acquires as a page number a numeric image 501B (for example, "123") existing in a marginal image region 501A of the registered image 501. Then, the document image checking section 203 compares the page number 502B of the read image 502 with the page number 501B of the registered image 501. In this manner, the document image checking section 203 searches, among the images 500 of documents stored in the particular memory M, for the registered image 501 whose page number 501B matches the page number 502B.

Depending on document type, the page number may be constituted by a combination of a particular character (such as "p" or "頁") and an arbitrary number, for example, "p123" or "123 頁". In such a case, the document image checking section 203 acquires the page number by searching for a combination of a character image of the particular character and a numeric image.

In some cases, it is difficult to unambiguously identify a desired document of the book based only on the page number. To cope with this, for example, the document image checking section 203 searches for an additional character image existing in the marginal image region 502A of the read image 502. If an additional character image 502C (for example, "ABC") exists in the marginal image region 502A, the document image checking section 203 acquires the character image 502C as a chapter title. Likewise, the document image checking section 203 acquires as a chapter title an additional character image 501C (for example, "ABC") existing in the marginal image region 501A of the registered image 501. Then, the document image checking section 203 searches for the registered image 501 not only the page number 501B of which matches the page number 502B of the read image 502 but also the chapter title 501C of which matches the chapter tile 502C of the read image 502.

In the case where each of the additional character images 502C and 501C is constituted by, for example, a combination of one or more images of particular characters (such as "Chapter" or a pair of "第" and "章") and an arbitrary numeric image, for example, "Chapter 1" or "第 1 章" the document image checking section 203 may search for a combination of the one or more images of particular characters and a numeric image, thus acquiring the retrieved combined character image 502C, 501C as a chapter number. In this case, the document image checking section 203 searches for the registered image 501 not only the page number 501B of which matches the page number 502B of the read image 502 but also the chapter number 501C of which matches the chapter number 502C of the read image 502.

By combining the page number and the chapter title or chapter number in the above manner, the possibility of achieving unambiguous identification of the registered image 501 of a desired document of the book can be increased. Furthermore, since the page number and the chapter title or chapter number exist in the marginal image region of the image of each document, it becomes possible that when the user allows the reading of the image of the document, only such a small region of the image has to be read. Moreover, each document of the book degrades over time to become stained or discolored, so that as shown in FIG. 5B the read image 502 of the document may reflect stains or appear discolored. The read image 502 of such a stained or discolored document is unsuitable for using the whole image in checking. However, since in this embodiment the page number or additionally the chapter title or chapter number is used as a check target, the desired document of the book can be identified with high accuracy even if the actual document gets dirty.

In S105, until the registered image 501 matching the read image 502 is found, the document image checking section 203 continues to search for it by acquiring the images 500 of pages stored in the particular memory M and checking each acquired image 500 against the read image 502 to determine whether or not the registered image 501 matching the read image 502 exists.

If as a result of the search the registered image 501 matching the read image 502 exists (see FIG. 3, YES in S105), the document image checking section 203 notifies the document image acquisition section 204 of the existence of the matching registered image 501. The document image acquisition section 204 having received the notification allows the display to display a unit acceptance screen 600 for use in accepting the specification of a unit of documents of the book (S106 in FIG. 3).

Figure 6A:
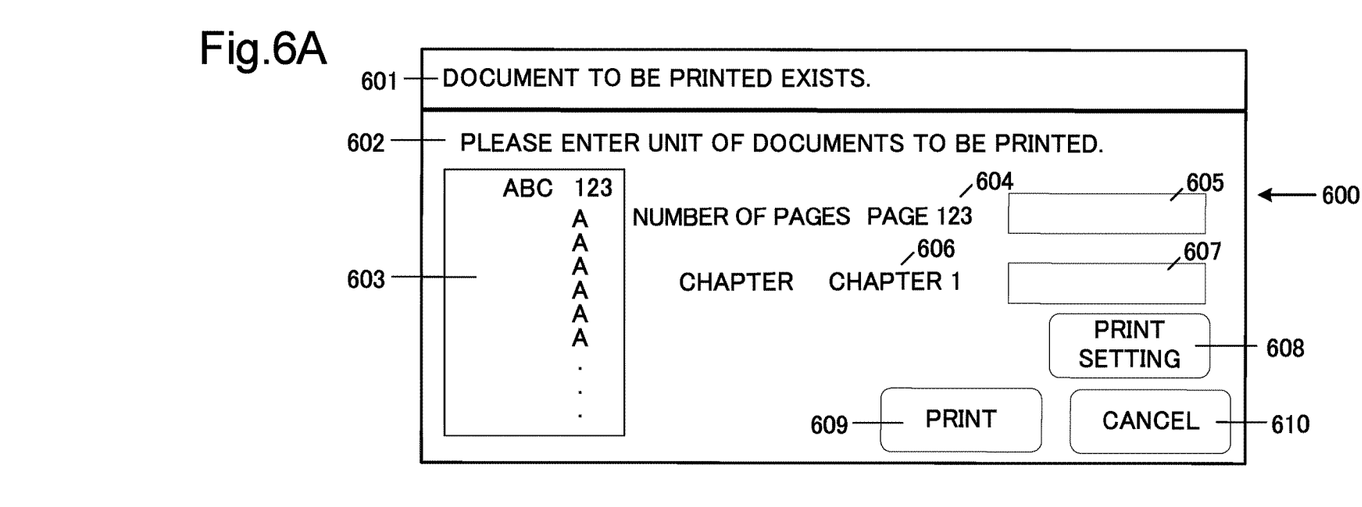
FIG. 6A is a view showing an example of a unit acceptance screen in the embodiment of the present disclosure.

As shown in FIG. 6A, displayed on the unit acceptance screen 600 are a message 601 indicating that the document to be printed has been found, a message 602 prompting the user to enter a unit of documents to be printed, a preview 603 of the registered image 501 of the document found by the search, the page number 604 ("Page 123" shown in FIG. 6A) of the found registered image 501, an entry field 605 for the number of pages, the chapter 606 ("Chapter 1" shown in FIG. 6A) to which the found registered image 501 belongs, an entry field 607 for the chapter, a print setting key 608 for use in entering print setting conditions, a print key 609 for executing printing, and a cancel key 610.

For example, in the case where the user requires printing of only the read image 502, while viewing the unit acceptance screen 600, the user operates the print key 609 using the operating section 101 without entering any number of pages into the entry field 605 and any chapter number into the entry field 607 using the operating section 101. Thus, the document image acquisition section 204 accepts a print instruction entered by the operation of the print key 609 and allows an unshown memory or the like to save only the registered image 501 having matched the read image 502 as data for image formation (S107 in FIG. 3). In other words, the document image acquisition section 204 acquires the registered image 501 having matched the read image 502 as data for image formation.

Figure 3:
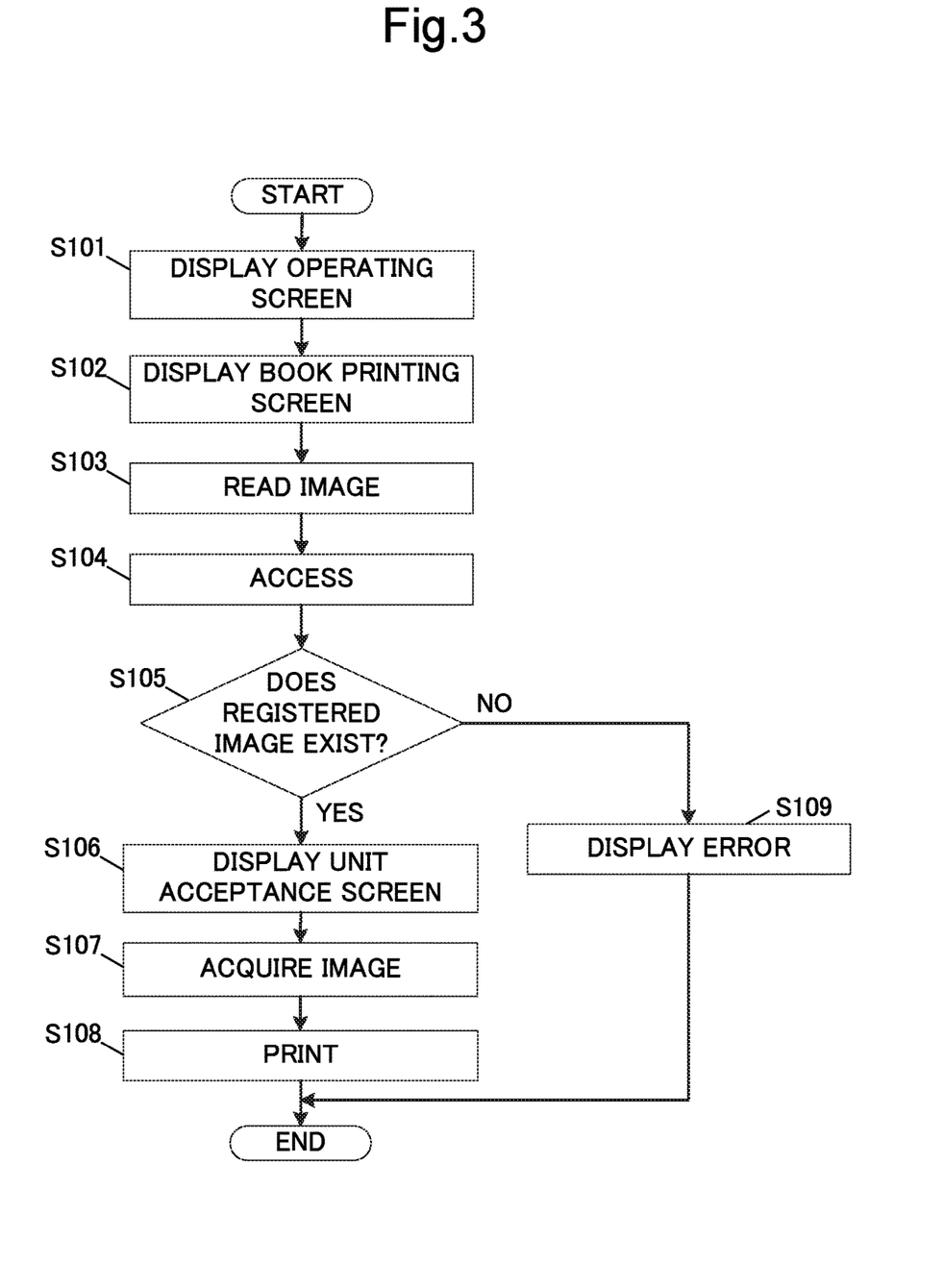
FIG. 3 is a flowchart showing an execution procedure in the embodiment of the present disclosure.

According to the notification from the document image acquisition section 204, the document image printing section 205 activates the sheet conveyance section 103 and the image forming section 104 to form an image on a paper sheet using the registered image 501 acquired in the above manner (S108 in FIG. 3). For example, the document image printing section 205 forms a toner image corresponding to the registered image 501, transfers the toner image to the paper sheet, fixes the toner image on the paper sheet with the fixing roller, and discharges the resultant printed matter.

Thus, the user can acquire a printed matter on which an image is formed using, not the read image 502 itself of the document of the book just scanned by the user, but the registered image 501 matching the read image 502. If in a normal book printing a document of the book becomes stained or discolored or the original glass plate has a scratch, the user may acquire a defective printed matter on which stains, discoloration or scratch have been reflected. Since in the present disclosure registered images 501 scanned from documents of a bland-new book are previously stored in the server 107 and the printing of a desired document of the book is performed using a corresponding registered image 501, the user can acquire a printed matter of the document in a bland-new condition.

In printing a plurality of registered images 501 in S106, the user executes the printing as follows. Specifically, for example, in the case where the user requires printing of the documents from Page 123 shown in the preview 603 to Page 142 which is the twentieth from Page 123, while viewing the unit acceptance screen 600, the user enters a particular number of pages "20" into the entry field 605 for the number of pages and operates the print key 609 using the operating section 101. In this case, the operating section 101 is an example of the number-of-page acceptance section defined in "What is claimed is".

Figure 6B:
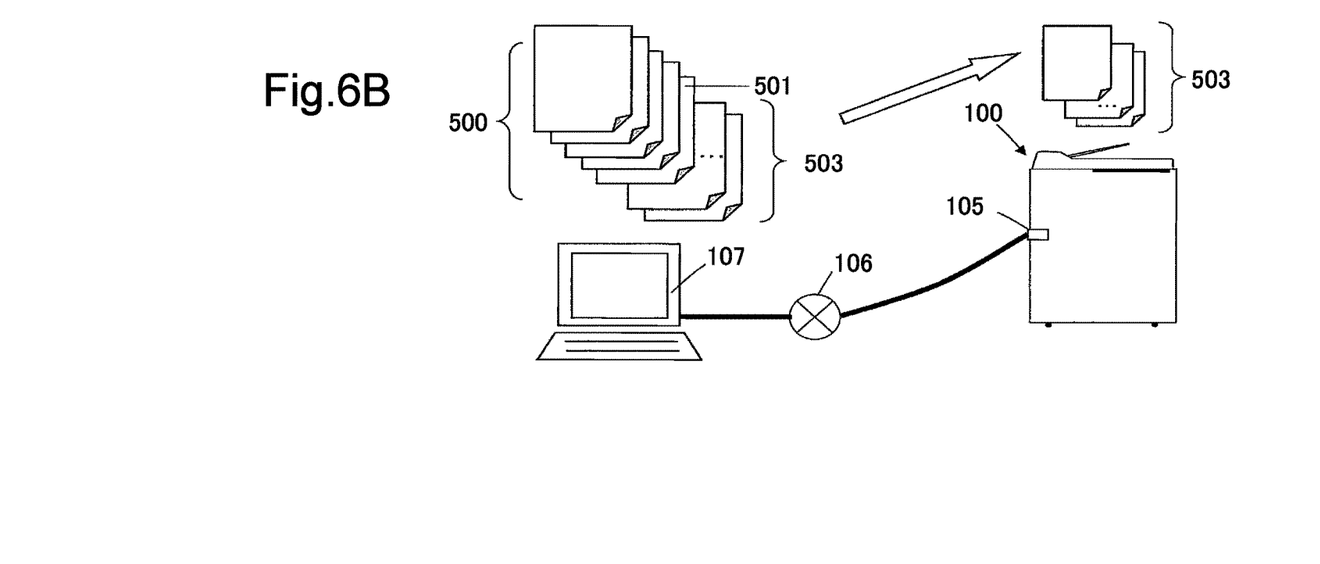
FIG. 6B is a view showing an example of acquisition of registered images in the image processing system according to the embodiment of the present disclosure.

Then, the document image acquisition section 204 accepts the selection of the print key 609 and the entry of the particular number of pages, accesses the particular memory M in the server 107, and acquires, from among the images 500 of documents of the book, images 503 of the particular number of pages ("20") beginning with the matching registered image 501, i.e., images of Page 123 to Page 142 (S107 in FIG. 3), as shown in FIG. 6B. Then, the document image printing section 205 forms images on paper sheets using the acquired images 503 of the specified pages (S108 in FIG. 3).

By entering the number of pages in the above manner, the user can easily print documents of that number of pages beginning with one document read on the occasion of printing. Therefore, the user can save the trouble of having to allow the multifunction peripheral 100 to read desired pages of the book one by one and easily acquire printed matters of documents of the book without much trouble. Furthermore, the user can easily print documents of a necessary number of pages by a single reading of an image of a document of the book.

Moreover, in executing printing of a plurality of images 503, user convenience can be improved, for example, by operating the print setting key 608, entering the setting conditions, such as aggregate printing or double-sided printing, and then executing the printing of the plurality of images 503.

If as a result of the search in S105 no registered image 501 matching the read image 502 exists (see FIG. 3, NO in S105), i.e., for example, if an image to be printed is not yet stored in the particular memory M of the server 107, the document image checking section 203 notifies the display acceptance section 201 of the absence of any registered image 501 matching the read image 502 and the display acceptance section 201 having received the notification allows the touch panel to display an error screen 700 indicating that there is no image of a desired document of the book (S109 in FIG. 3).

Figure 7A:
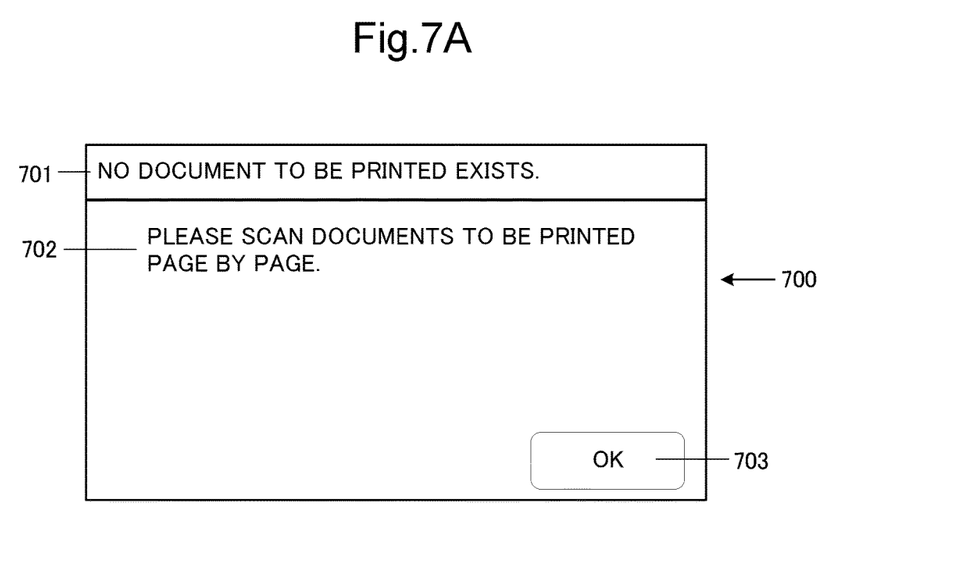
FIG. 7A is a view showing an example of an error screen in the embodiment of the present disclosure.

As shown in FIG. 7A, displayed on the error screen 700 are a message 701 indicating that no document to be printed exists, a message 702 prompting the user to scan the images of desired documents of the book one by one, and an OK key 703. In this case, the user operates the OK key 703 and prints one or more desired documents of the book in the normal printing process through the operating screen 400.

Although in S105 the document image checking section 203 uses the page number or additionally the chapter title or chapter number as a check target, it may use other images as check targets. For example, depending on the manner of the image reading section 102 reading the image of a document of the book, the document may be placed out of position relative to the original glass plate or the marginal image region may be partly missing, so that the document image checking section 203 may not be able to extract the page number, the chapter title or the chapter number of the image. To cope with such a case, check targets may be previously given priorities and the document image checking section 203 may select a check target according to the order of priorities and check the read image 502 against the registered image 501 based on the selected check target.

Figure 7B:
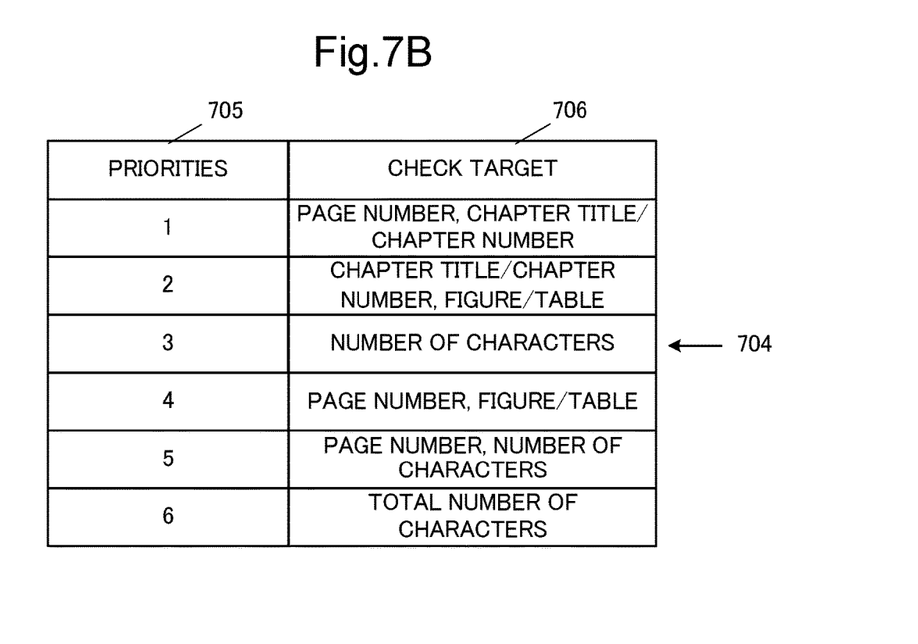
FIG. 7B shows an example of a check target table in the embodiment of the present disclosure.

For example, as shown in FIG. 7B, the document image checking section 203 previously stores a check target table 704 in which priorities 705 (for example, "1" and "2") are associated with respective check targets 706 (for example, "page number, chapter title/chapter number" and "chapter title/chapter number, figure/table"). In checking the read image 502 against the registered image 501, the document image checking section 203 refers to the check target table 704 and acquires a check target 706 ("page number, chapter title/chapter number") having the highest priority 705 ("1").

When the check target 706 is "page number, chapter title/chapter number", the document image checking section 203 acquires from the read image 502 its page number 502B and the chapter title or chapter number 502C and acquires from the registered image 501 its page number 501B and the chapter title or chapter number 501C in the above manner. The document image checking section 203 determines whether or not the page number 502B of the read image 502 matches the page number 501B of the registered image 501 and the chapter tile or chapter number 502C of the read image 502 matches the chapter title or chapter number 501C of the registered image 501.

For example, if the manner of the image reading section 102 reading a document of the book is bad so that the document image checking section 203 cannot properly acquire the page number 502B of the read image 502 which is an essential factor of the check target 706 and thus cannot perform checking, the document image checking section 203 acquires another check target 706 ("chapter title/chapter number, figure/table") having the second highest priority 705 ("2").

Figure 8A:
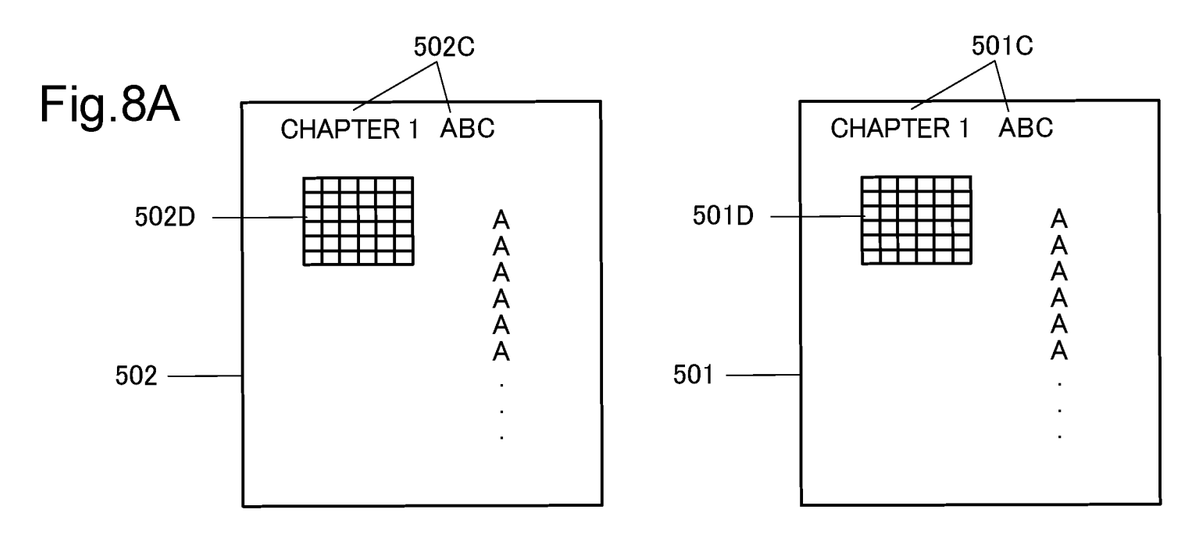
FIG. 8A is a view showing respective examples of a read image and a registered image each containing a figure or a table in the embodiment of the present disclosure.

When the check target 706 having the second highest priority 705 is "chapter title/chapter number, figure/table" as shown in FIG. 7B, the document image checking section 203, as shown in FIG. 8A, acquires the chapter title or chapter number 502C of the read image 502 and a figure or table 502D located in the read image 502 and acquires the chapter title or chapter number 501C of the registered image 501 and a figure or table 501D located in the registered image 501.

Then, the document image checking section 203 determines whether or not the chapter title or chapter number 502C of the read image 502 matches the chapter title or chapter number 501C of the registered image 501 and the figure or table 502D of the read image 502 matches the figure or table 501D of the registered image 501. The document image checking section 203 performs the checking of the figures or tables 501D, 502D, for example, by pattern matching. Thus, even if the page number, which is an essential factor of the check target 706 having the highest priority 705, cannot be read, it is possible to search for the registered image 501 matching the read image 502 by changing the factors of the check target 706.

If in the above case neither figure nor table exists depending on, for example, the type of the document of the book, the document image checking section 203 can acquire neither figure nor table 502D from the read image 502. In this case, the document image checking section 203 acquires still another check target 706 ("number of characters") having the third highest priority 705 ("3").

Figure 8B:
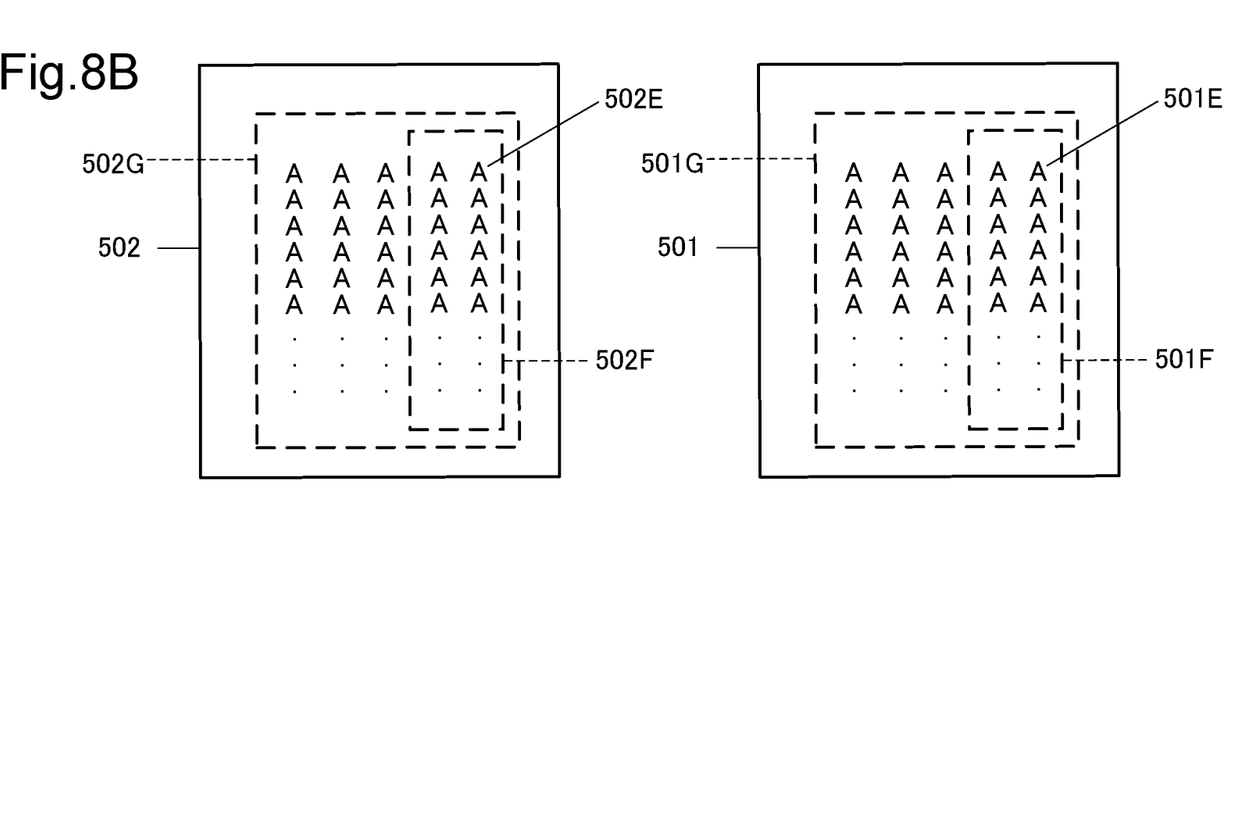
FIG. 8B is a view showing respective examples of a read image and a registered image each containing a partial document or a full document in the embodiment of the present disclosure.

When the check target 706 is "number of characters", the document image checking section 203, as shown in FIG. 8B, recognizes character images existing in the read image 502 as characters, for example, using an OCR function and acquires, as a document 502F, a predetermined number of characters (for example, "50" or "100") beginning with the character corresponding to the first character image 502E located at a particular end of the read image 502 (for example, an upper right end thereof in the longitudinal direction). Together with the document 502F, the document image checking section 203 also acquires as a document 501F the same number of characters beginning with the character corresponding to the first character image 501E located at the particular end of the registered image 501.

Then, the document image checking section 203 determines whether or not the document 502F of the read image 502 matches the document 501F of the registered image 501. Thus, the document image checking section 203 can search for the registered image 501 even if neither figure nor table exists. Alternatively, in the absence of figure and table, the document image checking section 203 may search for the registered image 501 matching the read image 502 by using as a check target a combination of the document 501F, 502F and the page number 501B, 502B or a combination of the document 501F, 502F and the chapter title or number 501C, 502C.

For another example, if neither chapter title nor chapter number exists or the particular registered image 501 cannot be searched for using the previously described check targets, the document image checking section 203 acquires still another check target 706 ("page number, figure/table") having the fourth highest priority 705 ("4").

Since in this example the check target 706 is "page number, figure/table", the document image checking section 203 acquires the page number 502B and a figure or table 502D of the read image 502, acquires the page number 501B and a figure or table 501D of the registered image 501, determines whether or not the page number 502B of the read image 502 matches the page number 501B of the registered image 501 and the figure or table 502D of the read image 502 matches the figure or table 501D of the registered image 501, and acquires the registered image 501 having the page number 501B and figure or table 501D matching those of the read image 502. Thus, even if neither chapter title nor chapter number exists, the document image checking section 203 can search for the registered image 501 matching the read image 502.

If neither chapter title nor chapter number and neither figure nor table exist, the document image checking section 203 acquires still another check target 706 ("page number, number of characters") having the fifth highest priority 705 ("5").

Since in this example the check target 706 is "page number, number of characters", the document image checking section 203 acquires the page number 502B and the document 502F of the read image 502, acquires the page number 501B and the document 501F of the registered image 501, determines whether or not the page number 502B of the read image 502 matches the page number 501B of the registered image 501 and the document 502F of the read image 502 matches the document 501F of the registered image 501, and acquires the registered image 501 having the page number 501B and document 501F matching those of the read image 502. In this case, the acquisition of the documents (partial documents) 501F, 502F and the determination of whether or not the partial document 502F matches the partial document 501F are performed, for example, in the same manner as in the above-described character recognition processing using the OCR function. Thus, even if neither chapter title nor chapter number and neither figure nor table exist, the document image checking section 203 can search for the registered image 501 matching the read image 502.

If none of the page number, the chapter title or chapter number, and the figure or table exists, the document image checking section 203 acquires still another check target 706 ("total number of characters") having the sixth highest priority 705 ("6").

Since in this example the check target 706 is "total number of characters", the document image checking section 203, as shown in FIG. 8B, acquires a full document 502G corresponding to all character images existing in the read image 502 and acquires a full document 501G corresponding to all character images existing in the registered image 501. Then, the document image checking section 203 determines whether or not the full document 502G of the read image 502 matches the full document 501G of the registered image 501 and acquires the registered image 501 having the full document 501G matching that of the read image 502. In this case, the acquisition of the full documents 501G 502G and the determination of whether or not the full document 502G matches the full document 501G are performed, for example, in the same manner as in the above-described character recognition processing using the OCR function. Thus, even if none of the page number, the chapter title or chapter number, and the figure or table exists, the document image checking section 203 can search for the registered image 501 matching the read image 502.

If the document image checking section 203 cannot search for the registered image 501 using the above six types of check targets 706, the display acceptance section 201 allows the display to display the above error screen 700 (S109 in FIG. 3).

The check target table 704 is not limited to the above configuration and may have any configuration, for example, as long as one or any combination of the page number, the chapter title, the chapter number, the figure, the table, and the number of characters contained in the document image is used as a check target and check targets are given respective different priorities.

The description in the above embodiment has been given of the case where the user enters a particular number of pages "20" into the entry field 605 for the number of pages. However, instead of this, the user may enter a particular chapter "Chapter 1" into the entry field 607 for the chapter and the document image acquisition section 204 may accept a print instruction through the operation of the print key 609 and the entry of the particular chapter, access the particular memory M in the server 107, and acquire from the images 500 of documents of the book a plurality of images 503 belonging to the particular chapter ("Chapter 1") containing the registered image 501 (S107 in FIG. 3). Then, the document image printing section 205 forms images on paper sheets using the acquired plurality of images 503 (S108 in FIG. 3). As seen from this, even when entering a chapter relating to the image to be printed, the user can easily print the documents of a necessary chapter. In this case, the operating section 101 is an example of the chapter number acceptance section defined in "What is claimed is".

The description in the above embodiment has been given of the case where the multifunction peripheral 100 of the image processing system 1 includes the above-described various sections (the display acceptance section 201 to the character image printing section 205). Instead of this, a program capable of implementing the above sections (the display acceptance section 201 to the character image printing section 205) of the multifunction peripheral 100 may be stored in a storage medium, such as an HDD or a memory, of the multifunction peripheral 100 and the CPU of the control circuit 10 may operate in accordance with the program to function as the above sections (the display acceptance section 201 to the character image printing section 205).

The description in the above embodiment has been given of the case where the server 107 of the image processing system 1 includes a particular memory M previously storing registered images of documents. Instead of this, a program capable of implementing the particular memory M may be stored in a storage medium, such as an HDD or a memory, of the server 107 and the CPU of the server 107 may operate in accordance with the program to function to include the particular memory M.

In these cases, the program itself read from the storage medium performs the operations and effects of an embodiment of the present disclosure.

The processing procedure of the multifunction peripheral 100 and the server 107 as described in the above embodiment can also be recognized as an image processing method performed by the multifunction peripheral 100 and the server 107.

INDUSTRIAL APPLICABILITY

As seen from the above, the image processing apparatus, the image processing system, and the image processing method according to the present disclosure are useful for an image processing system including an image processing apparatus, such as a multifunction peripheral or a copier, and effective as an image processing system and image processing method capable of providing high-quality printed matters in printing particular documents of a book.

What is claimed is:

1. An image processing apparatus connected to a server, the image processing apparatus comprising:
    a document image reading section configured to read, among documents constituting a book, an image of a document of at least one page of the book; and
    a control circuit that includes a CPU and, based on operation of the CPU in accordance with a program, operates as:
        a document image checking section configured to (1) OCR the read image of the document read by the document image reading section to detect a plurality of characters existing in the read image and acquire, among the plurality of characters, a predetermined number of characters beginning with a character located at a predetermined location, (2) acquire, among a plurality of characters contained in each of registered images of respective documents stored in the server, the same predetermined number of characters beginning with a character located at the predetermined location, and (3) determine whether or not the characters acquired from the read image match the characters acquired from the one registered image, thus determining whether or not the registered image matching the read image exists in all of the registered images of the documents stored in the server;
        a document image acquisition section configured to, when the document image checking section determines that the registered image matching the read image exists, acquire the matching registered image; and
        a document image printing section configured to form an image on a paper sheet using the registered image acquired by the document image acquisition section.

2. The image processing apparatus according to claim 1, wherein
    the control circuit further operates, based on operation of the CPU in accordance with the program, as a number-of-page acceptance section configured to accept an entry of a number of pages from a user,
    when the document image checking section determines that the registered image matching the read image exists, the document image acquisition section acquires, from the server, the registered images of the number of pages the entry of which has been accepted by the number-of-page acceptance section and which begins with the page indicated by the matching registered image, and
    the document image printing section forms images on paper sheets using the registered images of the number of pages acquired by the document image acquisition section.

3. The image processing apparatus according to claim 1, wherein
    the control circuit further operates, based on operation of the CPU in accordance with the program, as a chapter number acceptance section configured to accept an entry of a chapter number indicating a chapter from a user,
    wherein the document image acquisition section is further configured to acquire, from the server, one or more of the registered images of the documents stored in the server, the one or more registered images containing the chapter number the entry of which has been accepted by the chapter number acceptance section, and
    the document image printing section forms one or more images on one or more paper sheets using the one or more registered images acquired by the document image acquisition section.

4. The image processing apparatus according to claim 1, wherein
    the document image checking section comprises a check target table in which check targets each consisting of one or any combination of a page number, a chapter title, a chapter number, a figure, a table, a number of characters, and a total number of characters are stored together with respective different priorities given to the respective check targets, and
    the document image checking section is further configured to:
    search the registered images of the documents stored in the server for the registered image matching the read image of the document read by the document image reading section in terms of the highest priority check target stored in the check target table and acquire the matching registered image from the server;
    when the registered images of the documents stored in the server include no registered image matching the read image of the document read by the document image reading section in terms of the highest priority check target, search for the registered image matching the read image of the document read by the document image reading section in terms of the next highest priority check target stored in the check target table and acquire the matching registered image from the server;
    continue to check the read image against the registered images of the documents stored in the server until the registered image matching the read image in terms of the check target is searched out of the registered images of the documents in the server, and stop checking the read image against the registered images of the documents when the read image has been checked against the registered images of the documents in terms of all the priority check targets indicated in the check target table but no registered image matching the read image has been searched out;

when the check target is the number of characters, determine whether or not the predetermined number of characters acquired from the read image and beginning with the character located at the predetermined location match the same predetermined number of characters acquired from the one registered image and beginning with the character located at the predetermined location, thus determining whether or not the registered image matching the read image exists; and when the check target is the total number of characters, acquire all characters existing in the read image, acquire all characters existing in the one registered image of the document stored in the server, and determine whether or not all the characters acquired from the read image match all the characters acquired from the one registered image, thus determining whether or not the registered image matching the read image exists.

5. An image processing system comprising an image processing apparatus and a server, the server comprising a storage section configured to store registered images of documents constituting a book, the image processing apparatus comprising:

a document image reading section configured to read, among the documents constituting the book, an image of a document of at least one page of the book; and a control circuit that includes a CPU and, based on operation of the CPU in accordance with a program, operates as:

a document image checking section configured to (1) OCR the read image of the document read by the document image reading section to detect a plurality of characters existing in the read image and acquire, among the plurality of characters, a predetermined number of characters beginning with a character located at a predetermined location, (2) acquire, among a plurality of characters contained in each of registered images of respective documents stored in the server, the same predetermined number of characters beginning with a character located at the predetermined location, and (3) determine whether or not the characters acquired from the read image match the characters acquired from the one registered image, thus determining whether or not the registered image matching the read image exists in all of the registered images of the documents stored in the server;

a document image acquisition section configured to, when the document image checking section determines that the registered image matching the read image exists, acquire the matching registered image; and a document image printing section configured to form an image on a paper sheet using the registered image acquired by the document image acquisition section.

* * * * *